(12) United States Patent
Mitsugi

(10) Patent No.: US 12,113,364 B2
(45) Date of Patent: Oct. 8, 2024

(54) POWER STORAGE SYSTEM AND CONTROL DEVICE

(71) Applicant: TOSHIBA MITSUBISHI-ELECTRIC INDUSTRIAL SYSTEMS CORPORATION, Tokyo (JP)

(72) Inventor: Yasuaki Mitsugi, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 38 days.

(21) Appl. No.: 17/922,384

(22) PCT Filed: Feb. 17, 2021

(86) PCT No.: PCT/JP2021/005870
§ 371 (c)(1),
(2) Date: Oct. 31, 2022

(87) PCT Pub. No.: WO2022/176052
PCT Pub. Date: Aug. 25, 2022

(65) Prior Publication Data
US 2023/0187941 A1    Jun. 15, 2023

(51) Int. Cl.
*H02J 3/38*    (2006.01)
*H02J 3/16*    (2006.01)
(Continued)

(52) U.S. Cl.
CPC ............... *H02J 3/38* (2013.01); *H02J 3/16* (2013.01); *H02J 3/32* (2013.01); *H02J 7/0048* (2020.01); *H02J 2207/20* (2020.01)

(58) Field of Classification Search
CPC ........ H02J 3/38; H02J 3/16; H02J 3/32; H02J 7/0048; H02J 2207/20; H02J 3/381; H02J 2300/24; H02J 7/00; H02J 7/35
See application file for complete search history.

(56) References Cited

U.S. PATENT DOCUMENTS

| 6,741,065 B1 | 5/2004 | Ishii et al. |
| 2015/0002102 A1 | 1/2015 | Ohashi et al. |

(Continued)

FOREIGN PATENT DOCUMENTS

| JP | 3890168 B2 | 3/2007 |
| JP | 2013-172567 A | 9/2013 |

(Continued)

OTHER PUBLICATIONS

International Search Report and Written Opinion mailed on Apr. 20, 2021, received for PCT Application PCT/JP2021/005870, filed on Feb. 17, 2021, 13 pages including Machine English Translation.

*Primary Examiner* — Jung Kim
(74) *Attorney, Agent, or Firm* — XSENSUS LLP

(57) ABSTRACT

A power storage system includes multiple power storage devices, multiple power conversion devices, and a control device; the multiple power storage devices are capable of discharging and charging DC power; the multiple power conversion devices are connected to the multiple power storage devices and a bad, convert the DC power stored in the multiple power storage devices into power corresponding to the bad, supply the power to the bad based on the DC power stored in the multiple power storage devices, convert power of the load into DC power corresponding to the multiple power storage devices, and charge the multiple power storage devices based on the power of the load side; the control device controls a power conversion operation of the multiple power conversion devices. Accordingly, a power storage system and a control device are provided in which the power loss can be suppressed.

11 Claims, 3 Drawing Sheets

(51) Int. Cl.
*H02J 3/32* (2006.01)
*H02J 7/00* (2006.01)

(56) References Cited

U.S. PATENT DOCUMENTS

2020/0395782 A1* 12/2020 Kuboyama ....... H02J 13/00032
2021/0257839 A1  8/2021 Kato et al.

FOREIGN PATENT DOCUMENTS

| JP | 5924524 B2 | 5/2016 | |
| JP | WO2019180901 A1 * | 9/2019 | ................ H02J 3/32 |
| WO | 2020/084688 A1 | 4/2020 | |

* cited by examiner

POWER STORAGE SYSTEM AND CONTROL DEVICE

CROSS-REFERENCE TO RELATED APPLICATION

The present application is based on PCT filing PCT/JP2021/005870, filed Feb. 17, 2021, the entire contents of which are incorporated herein by reference.

FIELD

Embodiments described herein relate generally to a power storage system and a control device.

BACKGROUND ART

A known power storage system includes multiple power storage devices, multiple power conversion devices, and a control device. The multiple power conversion devices are provided to correspond respectively to the multiple power storage devices. The power conversion devices are connected to the power storage devices and are connected to a common load. The power conversion devices supply power to the load based on the power stored in the power storage devices, and charge the storage devices based on the power of the load side. The control device controls the power conversion operation of the multiple power conversion devices.

For example, such a power storage system is used to suppress fluctuation of the frequency of a power system. The power conversion devices are connected to the power system with the power system side as the voltage source, and suppress the frequency fluctuation of the power system by supplying power to the power system and charging the power storage devices with the power of the power system. Or, the power storage system is used in an electric vehicle such as an electric locomotive, an electric car, etc. The power conversion devices are connected to the motor of the electric vehicle with the motor as the load, supply power to the motor, and charge the power storage devices with the regenerative energy of the motor.

The control device determines the output of each of the multiple power conversion devices based on the power necessary for the load, and operates each of the multiple power conversion devices based on the determined output. However, in a control method in which all of the multiple power conversion devices are operated regardless of the magnitude of the power necessary for the load, the power loss accompanying the operation of the multiple power conversion devices is undesirably increased. It is therefore desirable to be capable of suppressing the power loss in the power storage system and the control device used in the power storage system.

PRIOR ART DOCUMENTS

Patent Documents

[Patent Document 1]
 Japanese Patent No. 3890168
[Patent Document 2]
 Japanese Patent No. 5924524

SUMMARY OF INVENTION

Technical Problem

Embodiments of the invention provide a power storage system and a control device in which the power loss can be suppressed.

Solution to Problem

A power storage system provided according to an embodiment of the invention includes multiple power storage devices, multiple power conversion devices, and a control device; the multiple power storage devices are capable of discharging and charging DC power; the multiple power conversion devices are connected to the multiple power storage devices and a load, convert the DC power stored in the multiple power storage devices into power corresponding to the load, supply the power to the load based on the DC power stored in the multiple power storage devices, convert power of the load into DC power corresponding to the multiple power storage devices, and charge the multiple power storage devices based on the power of the load side; the control device controls a power conversion operation of the multiple power conversion devices; the control device includes an output value determination part, a number determination part, a conversion device determination part, and a command transmitting part; the output value determination part determines a total value of active power and a total value of reactive power output from the multiple power conversion devices; the number determination part determines, based on the total value of the active power and the total value of the reactive power, a number of the power conversion devices among the multiple power conversion devices to which an operation command is to be transmitted; the conversion device determination part determines, as the power conversion devices to which the operation command is to be transmitted, prescribed power conversion devices among the multiple power conversion devices of the number determined by the number determination part; and the command transmitting part transmits the operation command to the power conversion devices determined by the conversion device determination part and transmits a standby command to the remaining power conversion devices among the multiple power conversion devices to which the operation command is not transmitted.

Advantageous Effects of Invention

According to embodiments of the invention, a power storage system and a control device are provided in which the power loss can be suppressed.

DESCRIPTION OF EMBODIMENTS

Figure 1:
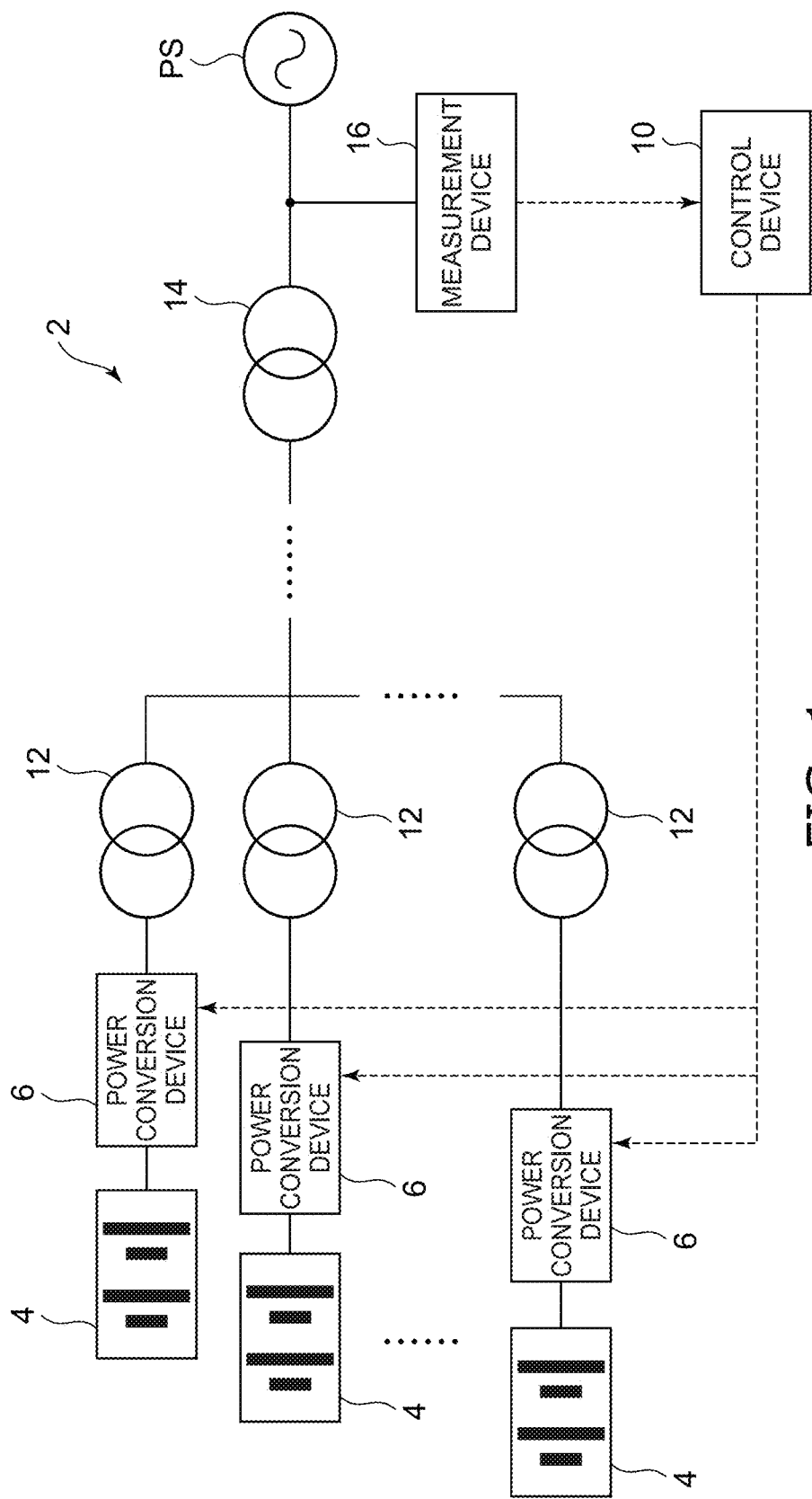
FIG. 1 is a block diagram schematically illustrating a power storage system according to an embodiment.

Embodiments will now be described with reference to the drawings.

The drawings are schematic and conceptual; and the relationships between the thicknesses and widths of portions, the proportions of sizes among portions, etc., are not necessarily the same as the actual values. Also, the dimensions and proportions may be illustrated differently among drawings, even for identical portions.

In the specification and drawings, components similar to those described previously or illustrated in an antecedent drawing are marked with the same reference numerals; and a detailed description is omitted as appropriate.

FIG. 1 is a block diagram schematically illustrating a power storage system according to an embodiment, As illustrated in FIG. 1, the power storage system 2 includes multiple power storage devices 4, multiple power conversion devices 6, and a control device 10, The multiple power storage devices 4 can store DC power, can supply (discharge) the stored DC power, and can re-store (be charged with) DC power according to an inflow of DC power that is greater than the stored DC power. The multiple power storage devices 4 are, for example, storage batteries. The multiple power storage devices 4 may be, for example, capacitors, etc. The multiple power storage devices 4 may be any device that can discharge and charge DC power.

The multiple power conversion devices 6 are provided to correspond respectively to the multiple power storage devices 4. The number of the multiple power conversion devices 6 is, for example, equal to the number of the multiple power storage devices 4. The multiple power conversion devices 6 are connected respectively to the multiple power storage devices 4. However, multiple power storage devices 4 may be connected to one power conversion device 6. The number of the multiple power conversion devices 6 may not always be equal to the number of the multiple power storage devices 4, The power storage system 2 further includes, for example, multiple transformers 12 and a transformer 14. The multiple transformers 12 are provided to correspond respectively to the multiple power conversion devices 6. The multiple power conversion devices 6 are connected to the multiple transformers 12. The multiple transformers 12 are connected to the transformer 14. The transformer 14 is connected to a power system PS. The multiple power conversion devices 6 are connected with the power system PS that is the load via the transformers 12 and 14, etc. A circuit breaker, more transformers, etc., may be located between the power conversion devices 6 and the power system PS. The configuration between the power system PS and the power conversion devices 6 may be any configuration that can connect the power conversion devices 6 to the power system PS.

The power of the power system PS (the load) is AC power. The power of the power system PS is, for example, three-phase AC power. However, the power of the power system PS (the load) is not limited to AC power and may be DC power, etc.

The multiple power conversion devices 6 converts the DC power stored in the multiple power storage devices 4 into power corresponding to the power system PS and converts the power of the power system PS into DC power corresponding to the multiple power storage devices 4. The multiple power conversion devices 6 include, for example, multiple switching elements and convert the power by switching the multiple switching elements.

The multiple powerconversion devices 6 supply the power to the power system PS based on the DC power stored in the multiple power storage devices 4 and charge the multiple power storage devices 4 based on the power of the power system PS side, Thereby, for example, the power storage system 2 suppresses the frequency fluctuation of the power system PS.

The power storage system 2 further includes, for example, a measurement device 16. For example, the measurement device 16 detects the active power value, the reactive power value, and the voltage value of the connection point between the power system PS and the multiple power conversion devices 6 and inputs the active power value, the reactive power value, and the voltage value that are detected to the control device 10.

The control device 10 controls the power conversion operation of the multiple power conversion devices 6. For example, the control device 10 controls the operations of the multiple power conversion devices 6 to suppress the frequency fluctuation of the power system PS based on the active power value, the reactive power value, and the voltage value of the connection point input from the measurement device 16.

Figure 2:
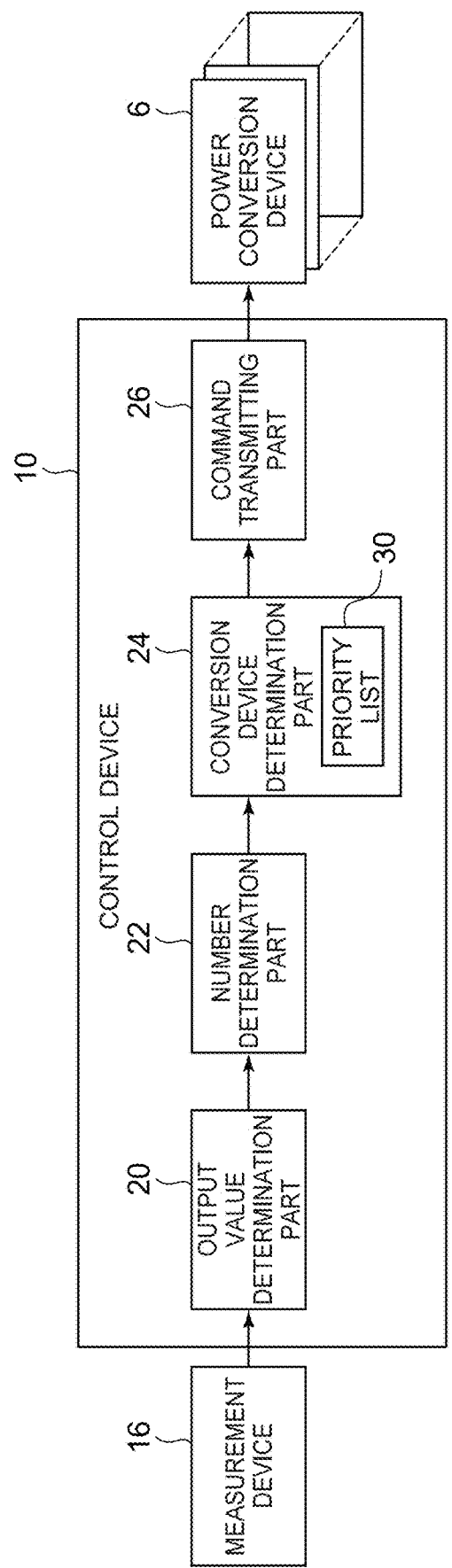
FIG. 2 is a block diagram schematically illustrating the control device according to the embodiment.

FIG. 2 is a block diagram schematically illustrating the control device according to the embodiment.

As illustrated in FIG. 2, the control device 10 includes an output value determination part 20, a number determination part 22, a conversion device determination part 24, and a command transmitting part 26.

The output value determination part 20 determines the total value of the active power and the total value of the reactive power output from the multiple power conversion devices 6. For example, based on the active power value, the reactive power value, and the voltage value of the connection point input from the measurement device 16, the output value determination part 20 determines the total value of the active power and the total value of the reactive power output from the multiple power conversion devices 6 by calculating the active power and the reactive power necessary to suppress the frequency fluctuation of the power system PS, However, the method for determining the total value of the active power and the total value of the reactive power is not limited to that described above. For example, the output value determination part 20 may determine the total value of the active power and the total value of the reactive power based on a command value input from a higher-level controller, etc. The method for determining the total value of the active power and the total value of the reactive power may be any method adapted to the system configuration of the power storage system 2, etc.

The number determination part 22 determines the number of the power conversion devices 6 among the multiple power conversion devices 6 to which the operation command is to be transmitted.

For example, the rated capacity of the active power per one of the multiple power conversion devices 6, the rated capacity of the reactive power per one of the multiple power conversion devices 6, the output margin of the active power of the multiple power conversion devices 6, and the output margin of the reactive power of the multiple power conversion devices 6 are set as parameters in the number determination part 22. In other words, the number determination part 22 includes information of the rated capacity of the active power, the rated capacity of the reactive power, the output margin of the active power, and the output margin of the reactive power beforehand.

The number determination part 22 determines the number of the power conversion devices 6 to which the operation command is to be transmitted based on the parameters described above and based on the total value of the active power and the total value of the reactive power determined by the output value determination part 20.

The number determination part 22 calculates a number D1 of the power conversion devices 6 necessary to output the active power by using the following Formula (1).

$$(D1) = \text{round}\left(\frac{(1 + B1) \times (Ap)}{S1}\right) \quad \text{[Formula 1]}$$

In Formula (1), Ap is the total value of the active power determined by the output value determination part 20. S1 is the rated capacity of the active power per one of the multiple power conversion devices 6. B1 is the output margin of the active power of the multiple power conversion devices 6. Any value between 0 to 1 (p. u.) is set as the output margin B1. Also, round is the roundup function. The number determination part 22 calculates the number D1 as an integer by rounding up digits to the right of the decimal point.

The number determination part 22 calculates a number D2 of the power conversion devices 6 necessary to output the reactive power by using the following Formula (2).

$$(D2) = \text{round}\left(\frac{(1 + B2) \times (Aq)}{S2}\right) \quad \text{[Formula 2]}$$

In Formula (2), Aq is the total value of the reactive power determined by the output value determination part 20. S2 is the rated capacity of the reactive power per one of the multiple power conversion devices 6. B2 is the output margin of the reactive power of the multiple power conversion devices 6. Any value between 0 to 1 (p. u.) is set as the output margin B2. Similarly to Formula (1), round is the roundup function. The number determination part 22 calculates the number D2 as an integer by rounding up digits to the right of the decimal point.

After calculating the number D1 of the power conversion devices 6 necessary to output the active power and the number D2 of the power conversion devices 6 necessary to output the reactive power, the number determination part 22 determines the larger among the numbers D1 and D2 as the number of the power conversion devices 6 to which the operation command is to be transmitted.

The method for calculating the numbers D1 and D2 is not always limited to that described above. For example, the number determination part 22 may calculate the numbers D1 and D2 as D1=Ap/(S1×B1) and D2=Aq/(S2×B2). In such a case, the output margins B1 and B2 are set to 1 (p. u.) when the power conversion device 6 is to be operated at the rated capacity, and the output margins B1 and B2 are set to any value less than 1 (p. u.) when the output of the power conversion device 6 is to be less than the rated capacity.

The output margins B1 and B2 may not always be set. For example, the number determination part 22 may calculate the numbers D1 and D2 as D1=Ap/S1 and D2=Aq/S2. The method for determining the number by the number determination part 22 may be any determination method based on at least the total value of the active power and the total value of the reactive power determined by the output value determination part 20.

The conversion device determination part 24 determines prescribed power conversion devices 6 among the multiple power conversion devices 6 of the number determined by the number determination part 22 as the power conversion devices 6 to which the operation command is to be transmitted. The conversion device determination part 24 includes, for example, a priority list 30 representing the priorities of the multiple power conversion devices 6. The conversion device determination part 24 determines the power conversion devices 6 among the multiple power conversion devices 6 in descending order of the priorities of the priority list 30 of the number determined by the number determination part 22 as the power conversion devices 6 to which the operation command is to be transmitted.

For example, when the number determination part 22 determines the number of the power conversion devices 6 to which the operation command is to be transmitted to be two, the conversion device determination part 24 determines the two power conversion devices 6 having high priorities in the priority list 30 as the power conversion devices 6 to which the operation command is to be transmitted.

After determining the power conversion devices 6 to which the operation command is to be transmitted, the conversion device determination part 24 inputs the information of the determined power conversion devices 6 to the command transmitting part 26.

Based on the information input from the conversion device determination part 24, the command transmitting part 26 transmits the operation command to the power conversion devices 6 determined by the conversion device determination part 24. For example, the command transmitting part 26 determines the active power and the reactive power per one power conversion device 6 by dividing the total value of the active power and the total value of the reactive power determined by the output value determination part 20 by the number determined by the number determination part 22 and transmits the operation command to the determined power conversion devices 6 to cause the determined power conversion devices 6 to output the determined active power and reactive power.

Also, the command transmitting part 26 transmits a standby command to the remaining power conversion devices 6 among the multiple power conversion devices 6 to which the operation command is not to be transmitted. The standby command is a command that stops the operation of the power conversion device 6. The standby command is, for example, a command that switches the multiple switching elements of the power conversion device 6 to the off-state. The standby command also may be called a gate block command, etc.

Also, for example, when a circuit breaker or the like is located between the power conversion device 6 and the power storage device 4 and between the power conversion device 6 and the transformer 12 (at the branch point of the multiple power conversion devices 6), the circuit breaker that corresponds to the power conversion devices 6 to which the standby command is to be transmitted is left in the on-state when the command transmitting part 26 transmits the standby command. In other words, when the command transmitting part 26 transmits the standby command, the power conversion device 6 is left in the state of being connected to the power storage device 4 and the power system PS; and only the operation of the power conversion device 6 is stopped by the transmission of the standby command. The standby command is, for example, a command that stops the operation of the power conversion device 6 while allowing the power conversion device 6 to be operated immediately.

For example, the control device 10 operates every prescribed control period such as 100 ms, etc. For example, for each control period, the control device 10 determines the total value of the active power and the total value of the reactive power output from the multiple power conversion devices 6 in the output value determination part 20, determines the number of the power conversion devices 6 to which the operation command is to be transmitted in the number determination part 22, determines the power conversion devices 6 to which the operation command is to be transmitted in the conversion device determination part 24, and transmits the operation command or the standby command from the command transmitting part 26 to the multiple power conversion devices 6. Thereby, the control device 10 controls the operations of the multiple power conversion devices 6 every prescribed control period.

Figure 3:
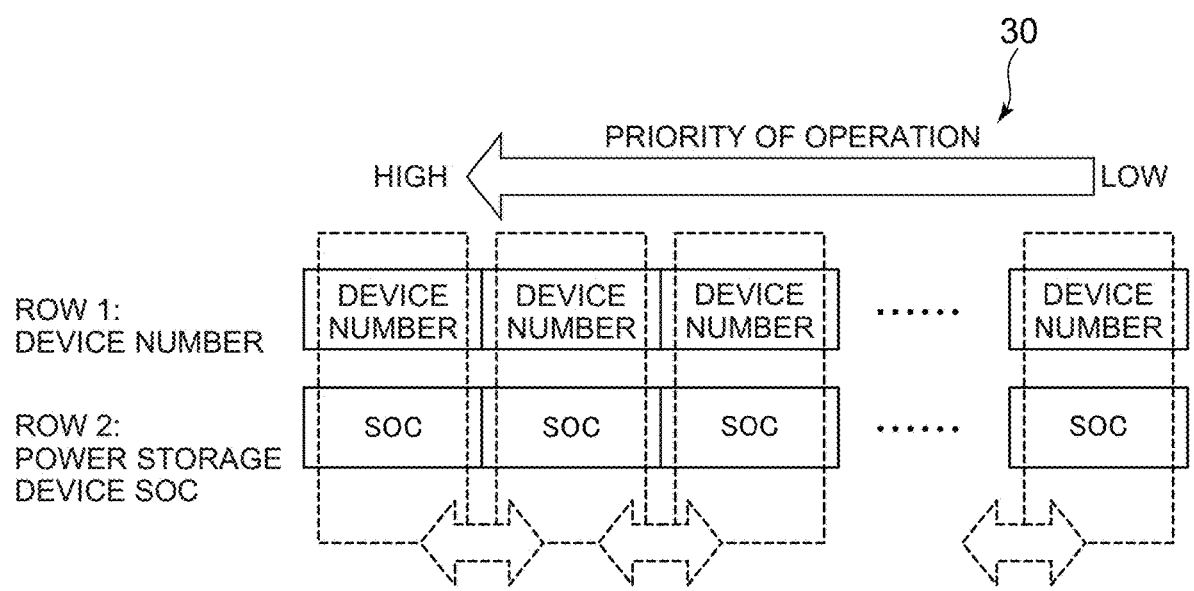
FIG. 3 is an explanatory drawing schematically illustrating an example of the priority list.

FIG. 3 is an explanatory drawing schematically illustrating an example of the priority list, As illustrated in FIG. 3, the priority list 30 represents the device number, the charge amount (SOC: State Of Charge), and the priority that are associated with each other. The priority list 30 is, for example, table data in which the device number, the charge amount, and the priority are associated.

The device numbers are unique numbers assigned respectively to the multiple power conversion devices 6 to identify the multiple power conversion devices 6. The charge amounts represent the charge amounts of the power storage devices 4 connected to the power conversion devices 6 represented by the device numbers. The priorities represent the priority order of transmitting the operation command to the power conversion devices 6 represented by the device numbers, Thus, the priority list 30 is, for example, table data in which the device numbers and charge amounts corresponding to the multiple power conversion devices 6 are arranged in descending order of the priorities.

For example, the conversion device determination part 24 determines the priorities of the multiple power conversion devices 6 of the priority list 30 according to the charge amounts of the multiple power storage devices 4. In such a case, the conversion device determination part 24 changes the priorities of the multiple power conversion devices 6 according to the direction in which the active power of the multiple power conversion devices 6 is output.

When the output direction of the active power of the multiple power conversion devices 6 is the discharge direction of supplying the power to the power system PS, the conversion device determination part 24 increases the priorities of the power conversion devices 6 having high charge amounts of the power storage devices 4. Then, when the output direction of the active power of the multiple power conversion devices 6 is the charge direction of charging the power storage devices 4 based on the power of the power system PS, the conversion device determination part 24 increases the priorities of the power conversion devices 6 having low charge amounts of the power storage device 4. The reduction and/or overcharge of the charge amounts of the multiple power storage devices 4 can be suppressed thereby.

The charge amounts of the multiple power storage devices 4 change according to the operations of the multiple power conversion devices 6. Therefore, when determining the priorities of the multiple power conversion devices 6 according to the charge amounts of the multiple power storage devices 4 as described above, the conversion device determination part 24 regularly updates the priorities of the multiple power conversion devices 6. For example, the conversion device determination part 24 updates the priorities of the multiple power conversion devices 6 for each control period of the control device 10. However, the period of updating the priorities may not always be equal to the control period.

When updating the priorities, first, the conversion device determination part 24 acquires the information of the charge amounts of the multiple power storage devices 4. In other words, the conversion device determination part 24 regularly acquires the information of the charge amounts of the multiple power storage devices 4. For example, the conversion device determination part 24 acquires the information of the charge amounts of the multiple power storage devices 4 for each control period. The information of the charge amounts of the multiple power storage devices 4 that is acquired is associated with the device numbers. Thereby, the conversion device determination part 24 can recognize the charge amounts of the multiple power storage devices 4 corresponding respectively to the multiple power conversion devices 6.

For example, the conversion device determination part 24 acquires the information of the charge amounts of the multiple power storage devices 4 from the multiple power storage devices 4, the multiple power conversion devices 6, etc. For example, the information of the charge amounts of the multiple power storage devices 4 may be acquired from a higher-level controller, etc.

After acquiring the information of the charge amounts of the multiple power storage devices 4, the conversion device determination part 24 updates the charge amounts of the priority list 30 based on the acquired information of the charge amounts. Thereby, the values of the charge amounts of the priority list 30 are updated to the current values of the charge amounts of the multiple power storage devices 4.

After updating the charge amounts, based on the total value of the active power output from the multiple power conversion devices 6 determined by the output value determination part 20, the conversion device determination part 24 determines whether the direction in which the active power of the multiple power conversion devices 6 is output is the direction of discharging from the multiple power storage devices 4 or the direction of charging the multiple power storage devices 4, For example, when the discharge direction is positive and the charge direction is negative, the conversion device determination part 24 determines the discharge direction or the charge direction based on the sign of the total value of the active power output from the multiple power conversion devices 6.

When the output direction of the active power is determined to be the discharge direction, the conversion device determination part 24 increases the priorities of the power conversion devices 6 having high charge amounts of the power storage devices 4. Also, when the output direction of the active power is determined to be the charge direction, the conversion device determination part 24 increases the priorities of the power conversion devices 6 having low charge amounts of the power storage device 4, The determination of the output direction of the active power may be performed before updating the charge amounts.

After updating the charge amounts and determining the output direction of the active power, the conversion device determination part 24 performs sort processing of the charge amounts after the update.

When the output direction of the active power is determined to be the discharge direction, the conversion device determination part 24 sorts the device numbers and the charge amounts in descending order of the charge amounts of the power storage devices 4. Thereby, after the values of the charge amounts of the priority list 30 are updated to the current values of the charge amounts of the multiple power storage devices 4, the priorities of the multiple power conversion devices 6 can be updated to increase the priorities of the power conversion devices 6 having high charge amounts of the power storage devices 4, Also, when the output direction of the active power is determined to be the charge direction, the conversion device determination part 24 sorts the device numbers and the charge amounts in ascending order of the charge amounts of the power storage device 4, Thereby, after the values of the charge amounts of the priority list 30 are updated to the current values of the charge amounts of the multiple power storage devices 4, the priorities of the multiple power conversion devices 6 can be updated to increase the priorities of the power conversion devices 6 having low charge amounts of the power storage device 4.

For example, the conversion device determination part 24 performs the sort processing by comparing the charge amounts corresponding to two adjacent power conversion devices 6 in the priority list 30.

When the output direction of the active power is the discharge direction, the conversion device determination part 24 compares the charge amounts corresponding to the two adjacent power conversion devices 6 in the priority list 30 in order from the high priority side and interchanges the order of the two power conversion devices 6 as necessary to increase the priorities of the power conversion devices 6 having high charge amounts.

At this time, for example, the conversion device determination part 24 provides a dead band in the comparison of the charge amounts corresponding to the two adjacent power conversion devices 6. When the difference of the two charge amounts is not less than a prescribed value, the conversion device determination part 24 interchanges the order of the two power conversion devices 6.

For example, the conversion device determination part 24 compares the power conversion device 6 having the highest priority and the power conversion device 6 having the second highest priority, and interchanges the order of the two power conversion devices 6 when the charge amount that corresponds to the power conversion device 6 having the second highest priority is greater than the charge amount corresponding to the power conversion device 6 having the highest priority by a prescribed value. In other words, the priority of the power conversion device 6 that was second becomes the highest; and the priority of the power conversion device 6 that was the highest becomes second.

For example, the prescribed value is set to about 2% to 3% of the maximum value of the charge amounts. Thereby, the order of the two power conversion devices 6 can be prevented from being interchanged too frequently. For example, an undesirable delay in the operations of the power conversion devices 6 due to the frequent interchange of the power conversion devices 6 to which the operation command is to be transmitted and the power conversion devices 6 to which the standby command is to be transmitted can be suppressed. However, the dead band may not always be provided.

The conversion device determination part 24 sequentially performs the processing described above in order from the high priority side. For example, after comparing the power conversion device 6 having the highest priority and the power conversion device 6 having the second highest priority, the conversion device determination part 24 compares the power conversion device 6 having the second highest priority and the power conversion device 6 having the third highest priority and sequentially performs this comparison. Thereby, when the output direction of the active power is the discharge direction, the conversion device determination part 24 sorts the charge amounts after the update in descending order of the charge amounts. In contrast to the description described above, when the output direction of the active power is the discharge direction, the charge amounts that correspond to two adjacent power conversion devices 6 in the priority list 30 may be compared in order from the low priority side.

When the output direction of the active power is the charge direction, the conversion device determination part 24 compares the charge amounts corresponding to the two adjacent power conversion devices 6 in the priority list 30 in order from the high priority side and interchanges the order of the two power conversion devices 6 as necessary to increase the priority of the power conversion device 6 having the lower charge amount. Thereby, when the output direction of the active power is the charge direction, the conversion device determination part 24 sorts the charge amounts after the update in ascending order of the charge amounts. In contrast to the description described above, when the output direction of the active power is the charge direction, the charge amounts corresponding to the two adjacent power conversion devices 6 in the priority list 30 may be compared in order from the low priority side.

For example, the conversion device determination part 24 performs the comparison processing of the charge amounts described above to perform $(N \times (N-1))/2$ iterations, where N is the number of the multiple power conversion devices 6. More specifically, N is the number of the power conversion devices 6 among the multiple power conversion devices 6 that can be operated.

When comparing two adjacent charge amounts, the comparison iterations necessary to compare all of the charge amounts of the priority list 30 once each is $N-1$ iterations. For example, when the number of the multiple power conversion devices 6 is five, the comparison iterations necessary to compare all of the charge amounts of the priority list 30 once each is a total of 4 iterations, i.e., the first and second priorities, the second and third priorities, the third and fourth priorities, and the fourth and fifth priorities. Thereby, the comparison can be performed once each from the charge amount of the power conversion device 6 having the highest priority to the charge amount of the power conversion device 6 having the lowest priority.

Thus, the power conversion device 6 having the highest priority or the power conversion device 6 having the lowest priority can be finalized by performing the comparison $N-1$ iterations. For example, when comparing the charge amounts in order from the high priority side and interchanging the order of the two power conversion devices 6 as necessary to increase the priorities of the power conversion devices 6 having high charge amounts, the power conversion device 6 having the lowest priority can be finalized by performing the comparison $N-1$ iterations. Conversely, when comparing the charge amounts in order from the low priority side and interchanging the order of the two power conversion devices 6 as necessary to increase the priorities of the power conversion devices 6 having high charge amounts, the power conversion device 6 having the highest priority can be finalized by performing the comparison $N-1$ iterations.

When continuing the comparison, the conversion device determination part 24 repeats similar processing for the remaining power conversion devices 6 other than the finalized power conversion devices 6.

For example, when the number of the multiple power conversion devices 6 is five, the fifth power conversion device 6 is finalized by comparing the first and second priorities, the second and third priorities, the third and fourth priorities, and the fourth and fifth priorities, after which the fourth power conversion device 6 is finalized by comparing the first and second priorities, the second and third priorities, and the third and fourth priorities; the third power conversion device 6 is finalized by comparing the first and second priorities and the second and third priorities; and the first and second power conversion devices 6 are finalized by comparing the first and second priorities. Thereby, the power conversion devices 6 can be sorted in an order corresponding to the charge amounts from the first to the fifth. In such a case, the comparison iterations are 10(4+3+2+1) iterations, which match $(5\times(5-1))/2=10$.

By sorting as described above, the N power conversion devices 6 can be appropriately sorted in an order corresponding to the charge amounts by the number of iterations determined from the formula above. Thereby, for example, the iterations of the comparison calculation can be less than when (N-1) calculations are repeated N times, etc. The N power conversion devices 6 can be appropriately sorted in an order corresponding to the charge amounts by relatively few calculation iterations.

By regularly performing the processing of the comparison of the charge amounts $(N\times(N-1))/2$ iterations, the conversion device determination part 24 sorts the charge amounts after the update in descending order of the charge amounts when the output direction of the active power is the discharge direction, and sorts the charge amounts after the update in ascending order of the charge amounts when the output direction of the active power is the charge direction.

For example, when updating the priorities for each control period of the control device 10, the conversion device determination part 24 performs the sort processing of the charge amounts after the update as described above, subsequently determines the power conversion devices 6 among the multiple power conversion devices 6 of the number determined by the number determination part 22 in descending order of the priorities of the priority list 30 as the power conversion devices 6 to which the operation command is to be transmitted, and inputs the information of the determined power conversion devices 6 to the command transmitting part 26.

The period of the update of the priorities may be set to be longer than the control period. For example, the update of the priorities may be performed at a frequency of once every two control periods, a frequency of once every three control periods, etc.

In the example above, the conversion device determination part 24 sorts all of the device numbers and charge amounts in the descending order of the charge amounts of the power storage devices 4 or in ascending order of the charge amounts of the power storage devices 4 for each period of the updating of the priorities. However, the sort processing of the charge amounts after the update is not limited to that described above.

For example, the conversion device determination part 24 may compare the charge amounts corresponding to two adjacent power conversion devices 6 in the priority list 30 in order from the high priority side or the low priority side for each period of the updating of the priorities and perform processing of interchanging the order of the two power conversion devices 6 as necessary once each for all of the charge amounts of the priority list 30.

In other words, the conversion device determination part 24 may finalize the power conversion device 6 having the highest priority or the power conversion device 6 having the lowest priority by performing the N-1 iterations of the comparison of the example above for each period of the updating of the priorities. In such a case as well, the conversion device determination part 24 may provide a dead band in the comparison of the charge amounts corresponding to the two adjacent power conversion devices 6.

When all of the device numbers and charge amounts are sorted for each period of the updating of the priorities as in the example above, there is a possibility that the power conversion devices 6 to which the operation command is to be transmitted and the power conversion devices 6 to which the standby command is to be transmitted may be largely interchanged when the output direction of the active power is changed.

For example, when the number of the multiple power conversion devices 6 is ten, and when the output direction of the active power is changed in a state in which the operation command is transmitted to five power conversion devices 6 among the ten power conversion devices 6 and the standby command is transmitted to the remaining five power conversion devices 6, there is a possibility that the power conversion devices 6 in the operating state and the power conversion devices 6 in the standby state may be interchanged at one time. In such a case, there is a possibility that the operations of the multiple power conversion devices 6 may be delayed, etc.

In contrast, when N-1 iterations of the comparison are performed for each period of the updating of the priorities, even when the output direction of the active power is changed, a large interchange of the power conversion devices 6 to which the operation command is to be transmitted and the power conversion devices 6 to which the standby command is to be transmitted can be suppressed.

For example, when the number of the multiple power conversion devices 6 is ten, and when the output direction of the active power is changed in a state in which the operation command is transmitted to five power conversion devices 6 among the ten power conversion devices 6 and the standby command is transmitted to the remaining five power conversion devices 6, the power conversion devices 6 to which the operation command is to be transmitted and the power conversion devices 6 to which the standby command is to be transmitted can be interchanged one at a time in descending order of the charge amounts or in ascending order of the charge amounts for each period of the updating of the priorities. A delay of the operations of the multiple power conversion devices 6, etc., can be suppressed thereby.

For example, the conversion device determination part 24 may perform $2\times(N-1)$ iterations of the comparison for each period of the updating of the priorities. In such a case, when the output direction of the active power is changed, the power conversion devices 6 to which the operation command is to be transmitted and the power conversion devices 6 to which the standby command is to be transmitted can be interchanged two at a time in descending order of the charge amounts or in ascending order of the charge amounts for each period of the updating of the priorities. It is sufficient to set the comparison iterations by the conversion device determination part 24 to any number of iterations between N-1 iterations and $(N\times(N-1))/2$ iterations.

The priorities of the multiple power conversion devices 6 may not always be determined according to the charge amounts of the multiple power storage devices 4. The priority list 30 may represent the device numbers and the priorities associated with each other. For example, there are cases where the capacities of the multiple power storage devices 4 and the capacities of the multiple power conversion devices 6 are different in the power storage system 2. In such a case, the priorities of the multiple power conversion devices 6 may be determined according to the capacities of the multiple power storage devices 4 or the capacities of the multiple power conversion devices 6. For example, the priorities of the multiple power conversion devices 6 may be determined in descending order of the capacities of the multiple power storage devices 4 or the capacities of the multiple power conversion devices 6.

Also, the method for determining the power conversion devices 6 to which the operation command is to be transmitted by the conversion device determination part 24 is not limited to a method that determines in descending order of the priorities of the priority list 30. For example, the conversion device determination part 24 may determine the power conversion devices 6 to which the operation command is to be transmitted based on a control signal input from an external device such as a higher-level controller, etc, In the power storage system 2 according to the embodiment as described above, the control device 10 determines the number of the power conversion devices 6 among the multiple power conversion devices 6 to which the operation command is to be transmitted based on the total value of the active power and the total value of the reactive power output from the multiple power conversion devices 6, and transmits the operation command to the prescribed power conversion devices 6 of the determined number and transmits the standby command to the remaining power conversion devices 6.

Thereby, in the power storage system 2 and the control device 10 according to the embodiment, the power loss accompanying the operations of the multiple power conversion devices 6 can be suppressed compared to a control method in which all of the multiple power conversion devices 6 are operated regardless of the magnitude of the power necessary for the power system PS (the load).

An example is shown in the embodiments described above in which the power system PS is used as a load, and the power storage system 2 is applied to the power system PS. The application of the power storage system 2 is not limited to the power system PS; for example, the power storage system 2 is applicable to an electric vehicle such as an electric locomotive, an electric car, etc. For example, the motor of the electric vehicle is used as the load; the multiple power conversion devices 6 are connected to the motor; and the power storage system 2 described above is applicable when supplying the power to the motor and using the regenerative energy of the motor to charge the multiple power storage devices 4. The load to which the power storage system 2 is applied is not limited to the power system PS or an electric vehicle, and may be any load for which the supply of the power to the load and the charge of the multiple power storage devices 4 by the power of the load side can be performed.

Hereinabove, exemplary embodiments of the invention are described with reference to specific examples. However, embodiments of the invention are not limited to these specific examples. For example, one skilled in the art may similarly practice the invention by appropriately selecting specific configurations of components included in the power storage system 2 and the control device 10 from known art, and such practice is within the scope of the invention to the extent that similar effects can be obtained.

Furthermore, combinations of any two or more components of the specific examples within the extent of technical feasibility also are within the scope of the invention to the extent that the purport of the invention is included, Furthermore, all power storage systems and control devices practicable by an appropriate design modification by one skilled in the art based on the power storage system 2 and the control device 10 described above as embodiments of the invention also are within the scope of the invention to the extent that the purport of the invention is included.

Furthermore, various modifications and alterations within the spirit of the invention will be readily apparent to those skilled in the art; and all such modifications and alterations should be seen as being within the scope of the invention.

Although several embodiments of the invention are described, these embodiments are presented as examples and are not intended to limit the scope of the invention. These novel embodiments may be carried out in other various forms; and various omissions, substitutions, and modifications can be performed without departing from the spirit of the invention. Such embodiments and their modifications are within the scope and spirit of the invention and are included in the invention described in the claims and their equivalents.

The invention claimed is:

1. A power storage system, comprising:
a plurality of power storage devices capable of discharging and charging direct current power;
a plurality of power conversion devices connected to the plurality of power storage devices and a load, the plurality of power conversion devices converting the direct current power stored in the plurality of power storage devices into power corresponding to the load, the plurality of power conversion devices supplying the power to the load based on the direct current power stored in the plurality of power storage devices, the plurality of power conversion devices converting power of the load into direct current power corresponding to the plurality of power storage devices, the plurality of power conversion devices charging the plurality of power storage devices based on the power of the load side; and
a control device controlling a power conversion operation of the plurality of power conversion devices,
the control device including
an output value determination part determining a total value of active power and a total value of reactive power output from the plurality of power conversion devices,
a number determination part determining, based on the total value of the active power and the total value of the reactive power, a number of the power conversion devices among the plurality of power conversion devices to which an operation command is to be transmitted,
a conversion device determination part determining, as the power conversion devices to which the operation command is to be transmitted, prescribed power conversion devices among the plurality of power conversion devices of the number determined by the number determination part, and
a command transmitting part transmitting the operation command to the power conversion devices determined by the conversion device determination part and transmitting a standby command to the remaining power conversion devices among the plurality of power conversion devices to which the operation command is not transmitted,
wherein the conversion device determination part includes a priority list representing priorities of the plurality of power conversion devices and determines, as the power conversion devices to which the operation command is to be transmitted, the power conversion devices among the plurality of power conversion devices of the number determined by the number determination part in descending order of the priorities of the priority list.

2. The power storage system according to claim 1, wherein
the number determination part includes information of a rated capacity of the active power per one of the plurality of power conversion devices and a rated capacity of the reactive power per one of the plurality of power conversion devices, and determines the number of the power conversion devices to which the operation command is to be transmitted based on the rated capacity of the active power, the rated capacity of the reactive power, and the total value of the active power and the total value of the reactive power determined by the output value determination part.

3. The power storage system according to claim 1, wherein
the priority list represents the priorities by associating device numbers for identifying the plurality of power conversion devices, charge amounts of the power storage devices connected to the power conversion devices represented by the device numbers, and the priorities representing a priority order of transmitting the operation command to the power conversion devices represented by the device numbers, and
the conversion device determination part determines the priorities of the plurality of power conversion devices of the priority list according to the charge amounts of the plurality of power storage devices.

4. The power storage system according to claim 3, wherein
when an output direction of the active power of the plurality of power conversion devices is a discharge direction of supplying the power to the load, the conversion device determination part increases the priorities of the power conversion devices having high charge amounts of the power storage devices, and
when the output direction of the active power of the plurality of power conversion devices is a charge direction of charging the power storage devices based on the power of the load, the conversion device determination part increases the priorities of the power conversion devices having low charge amounts of the power storage devices.

5. The power storage system according to claim 3, wherein
the conversion device determination part regularly updates the priorities of the plurality of power conversion devices of the priority list by
regularly acquiring information of the charge amounts of the plurality of power storage devices,
updating the charge amounts of the priority list based on the acquired information of the charge amounts, and
performing sort processing of the charge amounts after the updating.

6. The power storage system according to claim 5, wherein
when an output direction of the active power of the plurality of power conversion devices is a discharge direction of supplying the power to the load, the conversion device determination part sorts the device numbers and the charge amounts in descending order of the charge amounts of the power storage devices, and
when the output direction of the active power of the plurality of power conversion devices is a charge direction of charging the power storage devices based on the power of the load, the conversion device determination part sorts the device numbers and the charge amounts in ascending order of the charge amounts of the power storage devices.

7. The power storage system according to claim 6, wherein
when the output direction of the active power is the discharge direction, the conversion device determination part:
compares the charge amounts corresponding to two of the adjacent power conversion devices in the priority list in order from a high priority side or a low priority side;
performs processing of interchanging the order of the two power conversion devices as necessary to increase the priority of the power conversion device having the higher charge amount;
finalizes the power conversion device having the highest priority or the power conversion device having the lowest priority by performing the processing once each from the charge amount of the power conversion device having the highest priority to the charge amount of the power conversion device having the lowest priority; and
sorts the charge amounts after the updating in descending order of the charge amounts by repeating similar processing for the remaining power conversion devices other than the finalized power conversion device to cause an iteration of the comparison to be $(N\times(N-1))/2$ iterations, where N is the number of the plurality of power conversion devices, and
when the output direction of the active power is the charge direction, the conversion device determination part:
compares the charge amounts corresponding to two of the adjacent power conversion devices in the priority list in order from the high priority side or the low priority side;
performs processing of interchanging the order of the two power conversion devices as necessary to increase the priority of the power conversion device having the lower charge amount;
finalizes the power conversion device having the highest priority or the power conversion device having the lowest priority by performing the processing once each from the charge amount of the power conversion device having the highest priority to the charge amount of the power conversion device having the lowest priority; and
sorts the charge amounts after the updating in ascending order of the charge amounts by repeating similar processing for the remaining power conversion devices other than the finalized power conversion device to cause the iteration of the comparison to be $(N\times(N-1))/2$ iterations.

8. The power storage system according to claim 7, wherein
when comparing the charge amounts corresponding to the two adjacent power conversion devices, the conversion device determination part interchanges the order of the two power conversion devices when a difference of the two charge amounts is not less than a prescribed value.

9. The power storage system according to claim 5, wherein
for each period of the updating of the priorities, the conversion device determination part
compares the charge amounts corresponding to two of the adjacent power conversion devices in the priority list in order from a high priority side or a low priority side, and
performs processing of interchanging the order of the two power conversion devices as necessary once each for all of the charge amounts of the priority list.

10. A control device,
the control device controlling a power conversion operation of a plurality of power conversion devices,
the plurality of power conversion devices being connected to a plurality of power storage devices and a load,
the plurality of power conversion devices converting direct current power stored in the plurality of power storage devices into power corresponding to the load,
the plurality of power conversion devices supplying the power to the load based on the direct current power stored in the plurality of power storage devices,
the plurality of power conversion devices converting power of the load into direct current power corresponding to the plurality of power storage devices,
the plurality of power conversion devices charging the plurality of power storage devices based on the power of the load side,
the control device comprising:
an output value determination part determining a total value of active power and a total value of reactive power output from the plurality of power conversion devices;
a number determination part determining, based on the total value of the active power and the total value of the reactive power, a number of the power conversion devices among the plurality of power conversion devices to which an operation command is to be transmitted;
a conversion device determination part determining, as the power conversion devices to which the operation command is to be transmitted, prescribed power conversion devices among the plurality of power conversion devices of the number determined by the number determination part; and
a command transmitting part transmitting the operation command to the power conversion devices determined by the conversion device determination part and transmitting a standby command to the remaining power conversion devices among the plurality of power conversion devices to which the operation command is not transmitted,
wherein the conversion device determination part includes a priority list representing priorities of the plurality of power conversion devices and determines, as the power conversion devices to which the operation command is to be transmitted, the power conversion devices among the plurality of power conversion devices of the number determined by the number determination part in descending order of the priorities of the priority list.

11. A control method for a power conversion operation of a plurality of power conversion devices, comprising:
determining a total value of active power and a total value of reactive power output from the plurality of power conversion devices, the plurality of power conversion devices being connected to a plurality of power storage devices and a load, the plurality of power conversion devices converting direct current power stored in the plurality of power storage devices into power corresponding to the load, the plurality of power conversion devices supplying the power to the load based on the direct current power stored in the plurality of power storage devices, the plurality of power conversion devices converting power of the load into direct current power corresponding to the plurality of power storage devices, the plurality of power conversion devices charging the plurality of power storage devices based on the power of the load side;
determining, based on the total value of the active power and the total value of the reactive power, a number of the power conversion devices among the plurality of power conversion devices to which an operation command is to be transmitted;
determining, as the power conversion devices to which the operation command is to be transmitted, prescribed power conversion devices of the determined number of the power conversion devices among the plurality of power conversion devices, based on a priority list representing priorities of the plurality of power conversion devices, in descending order of the priorities of the priority list;
transmitting the operation command to the determined power conversion devices determined; and
transmitting a standby command to the remaining power conversion devices among the plurality of power conversion devices to which the operation command is not transmitted.

* * * * *